United States Patent
Ohira et al.

(10) Patent No.: US 7,734,185 B2
(45) Date of Patent: Jun. 8, 2010

(54) OPTICAL TRANSMITTER AND OPTICAL TRANSMISSION SYSTEM

(75) Inventors: Tomoaki Ohira, Osaka (JP); Kouichi Masuda, Osaka (JP); Masaru Fuse, Osaka (JP)

(73) Assignee: Panasonic Corporation, Osaka (JP)

( * ) Notice: Subject to any disclaimer, the term of this patent is extended or adjusted under 35 U.S.C. 154(b) by 490 days.

(21) Appl. No.: 11/878,261

(22) Filed: Jul. 23, 2007

(65) Prior Publication Data

US 2008/0031630 A1 Feb. 7, 2008

(30) Foreign Application Priority Data

Aug. 1, 2006 (JP) .............................. 2006-210010

(51) Int. Cl.
H04B 10/00 (2006.01)
H04B 10/04 (2006.01)

(52) U.S. Cl. ...................................... 398/140; 398/185

(58) Field of Classification Search .................. 398/140, 398/185

See application file for complete search history.

(56) References Cited

U.S. PATENT DOCUMENTS

2007/0019968 A1* 1/2007 Hashimoto et al. .......... 398/198

FOREIGN PATENT DOCUMENTS

| JP | 2001-133824 | 5/2001 |
|---|---|---|
| JP | 2006-049977 | 2/2006 |
| JP | 2006-287410 | 10/2006 |

* cited by examiner

*Primary Examiner*—Shi K Li
(74) *Attorney, Agent, or Firm*—Wenderoth, Lind & Ponack, L.L.P.

(57) ABSTRACT

An optical SSB-SC modulation section 13 subjects an optical signal fa outputted from an optical source 11 to an optical SSB-SC modulation based on the amplitude of an external electric signal fc to thereby output an optical intensity-modulated signal. An optical phase modulation section 14 subjects the optical signal fa to an optical phase modulation based on the amplitude levels of the first to $n^{th}$ external electric signals having frequencies f1 to fn to thereby output the resultant signal as an optical phase-modulated signal. An optical combining section 15 combines together the optical intensity-modulated signal and the optical phase-modulated signal. An optical detecting section 16 performs an optical homodyne detection through a squared detection of the optical intensity-modulated signal and the optical phase-modulated signal combined together to thereby produce a wideband modulated signal, being the difference beat signal between the two optical signals. A combining section 17 combines together the wideband modulated signal and the $o^{th}$ to $t^{th}$ electric signals having frequencies fo to ft to thereby output the resultant signal as a wideband modulated signal.

8 Claims, 14 Drawing Sheets

OPTICAL TRANSMITTER AND OPTICAL TRANSMISSION SYSTEM

BACKGROUND OF THE INVENTION

1. Field of the Invention

The present invention relates to an optical transmitter and an optical transmission system, and more particularly to an optical transmitter capable of producing an optical wideband modulated signal from a multi-channel video signal being a source signal, and an optical transmission system including such an optical transmitter.

2. Description of the Background Art

Various conventional systems have been proposed in the art for transmitting/distributing multi-channel video signals to subscriber premises. For example, an optical CATV system has been proposed in the art, including a down-converter for converting an IF signal (frequency: about 1 to 2.6 GHz) of satellite broadcasting such as BS digital, BS analog and CS digital to a signal of a lower frequency, i.e., lowering the frequency of a multi-channel video signal to 770 MHz or less. However, the number of programs increases as the broadcasting media are more digitalized, whereby there will be a shortage of the video signal band.

In view of this problem, new systems have been discussed, which are capable of transmitting high-frequency signals such as satellite broadcasting signals without frequency conversion and realizing high-frequency, wideband modulation while improving noise characteristics. See, for example, Japanese Laid-Open Patent Publication No. 2006-049977 (page 10, FIG. 1) and Japanese Laid-Open Patent Publication No. 2001-133824 (page 25, FIG. 1).

FIG. 11 is a block diagram showing a configuration of a conventional optical transmission system 100.

Referring to FIG. 11, the conventional optical transmission system 100 includes an optical transmitter 110 and an optical receiver 150 connected to each other via an optical fiber 170. The optical transmitter 110 includes an optical source 111, an optical branching section 112, an optical intensity modulation section 113, an optical phase modulation section 114, an optical combining section 115, an optical detecting section 116, and an optical transmitter section 118. The optical receiver 150 includes an optical receiver section 151 and an FM demodulation section 155. The optical intensity modulation section 113 is, for example, an optical SSB-SC (Single Side Band with Suppressed Carrier) modulator.

FIG. 12 is a schematic diagram showing exemplary signal spectra at different locations (12a to 12g) in the conventional optical transmission system 100.

First, the operation of the components of the optical transmitter 110 will be described.

The optical source 111 outputs an unmodulated optical signal having a frequency fa (wavelength λa) (hereinafter referred to as an "optical signal fa"). The optical branching section 112 splits the optical signal fa into two signals, which are inputted respectively to the optical intensity modulation section 113 and the optical phase modulation section 114. The optical intensity modulation section 113 receives an electric signal having a frequency fc (hereinafter referred to as an "electric signal fc") (FIG. 12 (12a)). The optical phase modulation section 114 receives a first multi-channel signal including first to $n^{th}$ electric signals having frequencies f1 to fn (f1<fn, n is an integer), respectively, and a second multi-channel signal including $o^{th}$ to $t^{th}$ electric signals having frequencies fo to ft (fo<ft, o and t are integers) (FIG. 12 (12c)).

The optical intensity modulation section 113 subjects the input optical signal fa to an optical intensity modulation (or an optical amplitude modulation) based on the amplitude of the electric signal fc to output the resultant signal as an optical intensity-modulated signal (FIG. 12 (12b)). The optical phase modulation section 114 subjects the optical signal fa to an optical phase modulation (or an optical frequency modulation) based on the amplitude level of the first multi-channel signal and that of the second multi-channel signal to output the resultant signal as an optical phase-modulated signal (FIG. 12 (12d)).

The optical combining section 115 combines together the optical intensity-modulated signal outputted from the optical intensity modulation section 113 and the optical phase-modulated signal outputted from the optical phase modulation section 114 (FIG. 12 (12e)). The optical detecting section 116 may be a photodiode having squared detection characteristics, or the like, and performs an optical homodyne detection through a squared detection of the optical intensity-modulated signal and the optical phase-modulated signal combined together by the optical combining section 115 to thereby produce a wideband modulated signal, being the difference beat signal between the two optical signals. The wideband modulated signal is a phase-modulated signal obtained by down-converting the optical phase-modulated signal outputted from the optical phase modulation section 114, and the center frequency thereof is fc (FIG. 12 (12f)). The optical transmitter section 118 may be a semiconductor laser, or like, and performs a predetermined modulation, e.g., an optical intensity modulation, on the first to $t^{th}$ electric signals with the original signal being the wideband modulated signal outputted from the optical detecting section 116 to thereby transmit the resultant signal as an optical wideband modulated signal to the optical fiber 170.

The operation of the components of the optical receiver 150 will now be described. The optical receiver section 151 receives an optical wideband modulated signal transmitted through the optical fiber 170, and performs a photoelectric conversion to output a wideband modulated signal. The FM demodulation section 155 performs an FM demodulation on the wideband modulated signal to output a multi-channel signal in which the first multi-channel signal and the second multi-channel signal are mixed together (FIG. 12 (12g)).

However, when a high-frequency signal as represented by the second multi-channel signal in the conventional optical transmission system 100, or a signal of an even higher frequency (e.g., up to about 2.6 GHz), is inputted and transmitted, the bandwidth of the wideband modulated signal becomes too wide for the bandwidth of the conventional optical receiver section 151 and the conventional FM demodulation section 155. Thus, it is necessary to replace the components. The bandwidth B_FM of the wideband modulated signal produced by the optical transmitter 110 can be derived from the Komai-Carson law shown in Expression 1 below. In the expression, p is the peak factor representing the ratio between the maximum amplitude (the peak power) of the multi-channel signal and the average amplitude (the average power) thereof, ΔF is the frequency deviation [Hz/ch], N is the number of channels, and f_max is the highest frequency [Hz] of the multi-channel signal.

$$B\_FM = 2 \times (p \cdot \Delta F \cdot \sqrt{N} + f\_max) \quad \text{Exp. 1}$$

Where the input multi-channel video signal has about 100 channels whose frequencies are up to about 2.6 GHz, and has a frequency deviation of 40 MHz/ch and a peak factor of 3.3, the wideband modulated signal outputted from the optical transmitter 110 will have a bandwidth of about 7.8 GHz. Therefore, it is necessary to increase the bandwidth of the optical receiver section 151 and that of the FM demodulation section 155. Moreover, there is a phenomenon that a component based on the wideband modulated signal is outputted from the FM demodulation section 155, which deteriorates the characteristics of the multi-channel signal component demodulated by the FM demodulation section 155. In order to avoid the component deterioration, it is necessary to set the center frequency of the wideband modulated signal to be very high, i.e., about 16.5 GHz. Therefore, it is necessary to, for example, replace components used for level adjustment such as amplifiers, in addition to the optical receiver section 151 and the FM demodulation section 155 used in the optical receiver 150.

SUMMARY OF THE INVENTION

Therefore, an object of the present invention is to provide an optical transmitter, with which it is possible to increase the bandwidth of the multi-channel signal and to transmit the multi-channel signal at once, without a significant change in the design of the optical receiver section and the FM demodulation section, and an optical transmission system including such an optical transmitter.

The present invention is directed to an optical transmitter for optically transmitting a plurality of electric signals, and to an optical transmission system including such an optical transmitter. In order to attain the object set forth above, a basic optical transmitter of the present invention includes an optical source, an optical branching section, a multiplier section, a filter, an optical intensity modulation section, an optical angle modulation section, an optical combining section, an optical detecting section, and an optical transmitter section.

The optical source outputs an unmodulated optical signal. The optical branching section splits the optical signal into two signals. The multiplier section multiplies together an electric signal having a frequency fc and a plurality of electric signals having frequencies fo to ft (fo<ft). The filter selectively extracts signal components having frequencies fc to fc+ft from the signal obtained by the multiplication at the multiplier section. The optical intensity modulation section subjects one of the split optical signals from the optical branching section to an optical intensity modulation with an electric signal of a predetermined frequency extracted by the filter to thereby produce an optical intensity-modulated signal. The optical angle modulation section subjects the other one of the split optical signals from the optical branching section to an optical angular modulation with a plurality of electric signals having frequencies f1 to fn (f1<fn) different from frequencies fo to ft to thereby produce an optical angle-modulated signal. The optical combining section optically combines together the optical intensity-modulated signal and the optical angle-modulated signal. The optical detecting section subjects the combined optical signal from the optical combining section to a squared detection to thereby convert the combined optical signal to a modulated signal. The optical transmitter section converts the modulated signal from the optical detecting section to an optical signal and transmits the obtained optical signal.

In order to attain the object set forth above, another optical transmitter of the present invention includes an optical source, an optical branching section, an optical intensity modulation section, an optical angle modulation section, an optical combining section, an optical detecting section, and an optical transmitter section.

The optical source outputs an unmodulated optical signal. The optical branching section splits the optical signal into two signals. The optical intensity modulation section subjects one of the split optical signals from the optical branching section to an optical intensity modulation with an electric signal having a frequency fc and a plurality of electric signals having frequencies fo to ft (fo<ft) to thereby produce an optical intensity-modulated signal. The optical angle modulation section subjects the other one of the split optical signals from the optical branching section to an optical angular modulation with a plurality of electric signals having frequencies f1 to fn (f1<fn) different from frequencies fo to ft to thereby produce an optical angle-modulated signal. The optical combining section optically combines together the optical intensity-modulated signal and the optical angle-modulated signal. The optical detecting section subjects the combined optical signal from the optical combining section to a squared detection to thereby convert the combined optical signal to a modulated signal. The optical transmitter section converts the modulated signal from the optical detecting section to an optical signal and transmits the obtained optical signal.

It is preferred that the frequency fc, a bandwidth fw of the optical angle-modulated signal and the frequency ft satisfy ft<fc−fw/2. In one embodiment, the optical transmitter further includes a filter for selectively extracting signal components having frequencies fo to fc+fw/2 from the modulated signal from the optical detecting section to output the extracted signal components to the optical transmitter section. The optical intensity modulation performed by the optical intensity modulation section is typically a single-sideband suppressed-optical carrier optical intensity modulation or a double-sideband suppressed-optical carrier optical intensity modulation.

A basic optical receiver of the optical transmission system includes: an optical receiver section for receiving the optical signal transmitted from the optical transmitter section and converting the received optical signal to a modulated signal; a branching section for splitting the modulated signal from the optical receiver section into two signals; a first filter for selectively extracting signal components having frequencies f1 to fn from one of the split signals from the branching section; a second filter for selectively extracting signal components having frequencies fo to ft from the other one of the split signals from the branching section; and an FM demodulation section for performing an FM demodulation on the electric signal extracted through the first filter.

Alternatively, the optical receiver includes: an optical branching section for splitting the optical signal transmitted from the optical transmitter section into two signals; a first optical receiver section for receiving one of the split optical signals from the branching section and converting the received optical signal to a modulated signal; a second optical receiver section for receiving the other one of the split optical signals from the branching section and converting the received optical signal to a modulated signal; an FM demodulation section for performing an FM demodulation on the modulated signal from the first optical receiver section; a first filter for selectively extracting signal components having frequencies f1 to fn from the FM-demodulated signal from the FM demodulation section; and a second filter for selectively extracting signal components having frequencies fo to ft from the modulated signal from the second optical receiver section.

With the present invention, it is possible to increase the bandwidth of the input multi-channel signal and to transmit the multi-channel signal at once, without a significant change in the design of the optical receiver, including the increase in the bandwidth of the FM demodulation section.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described with reference to the drawings.

First Embodiment

Figure 1:
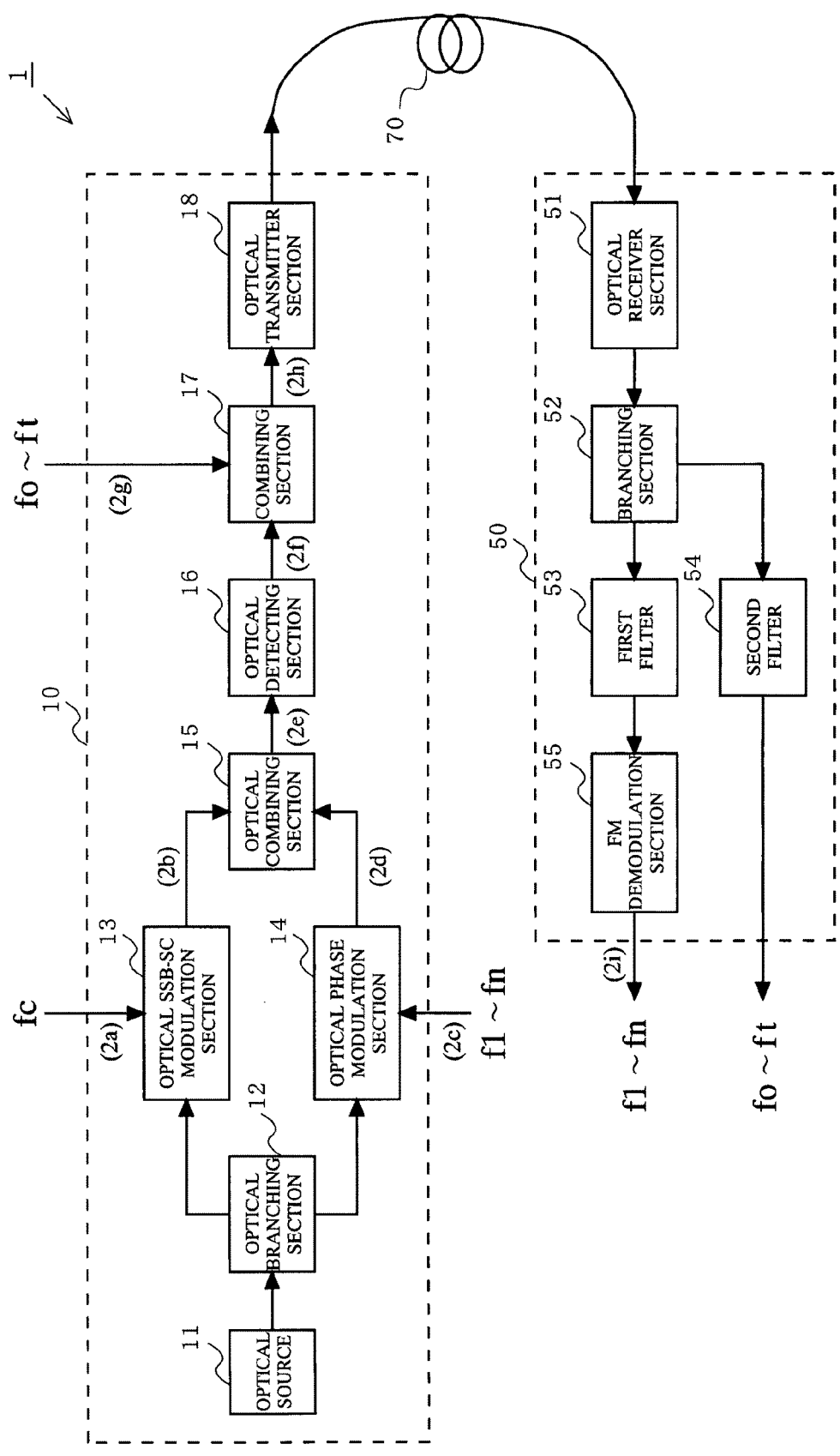
FIG. 1 is a block diagram showing a configuration of an optical transmission system 1 according to a first embodiment of the present invention.

FIG. 1 is a block diagram showing a configuration of an optical transmission system 1 according to a first embodiment of the present invention. The optical transmission system 1 includes an optical transmitter 10 and an optical receiver 50 connected to each other via an optical fiber 70. The optical transmitter 10 includes an optical source 11, an optical branching section 12, an optical intensity modulation section 13, an optical phase modulation section 14, an optical combining section 15, an optical detecting section 16, a combining section 17, and an optical transmitter section 18. The optical receiver 50 includes an optical receiver section 51, a branching section 52, first and second filters 53 and 54, and an FM demodulation section 55. The optical intensity modulation section 13 used in the optical transmission system 1 will be referred to as the optical SSB-SC modulation section 13 because it performs an optical SSB-SC modulation.

Figure 2:
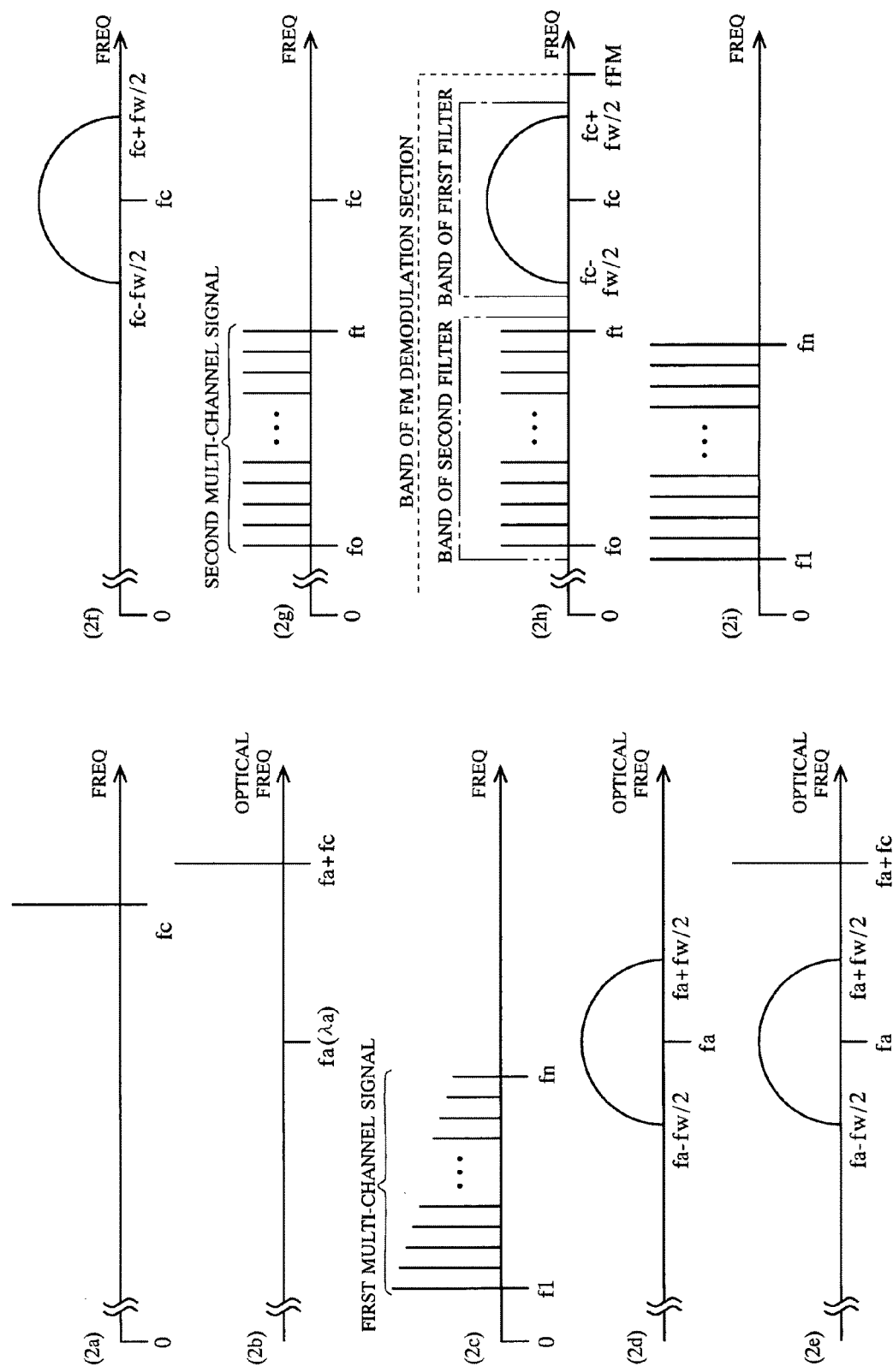
FIG. 2 is a schematic diagram showing exemplary signal spectra at different locations in the optical transmission system 1.

FIG. 2 is a schematic diagram showing exemplary signal spectra at different locations (2a to 2i) in the optical transmission system 1.

First, the operation of the components of the optical transmitter 10 will be described.

The optical source 11 outputs an unmodulated optical signal (the optical signal fa) having a frequency fa (wavelength λa). The optical branching section 12 splits the optical signal fa into two signals, which are inputted respectively to the optical SSB-SC modulation section 13 and the optical phase modulation section 14. The optical SSB-SC modulation section 13 receives an electric signal having a frequency fc (the electric signal fc) (FIG. 2 (2a)) The optical phase modulation section 14 receives first to $n^{th}$ electric signals having frequencies f1 to fn (the first multi-channel signal) (FIG. 2 (2c)).

Figure 3:
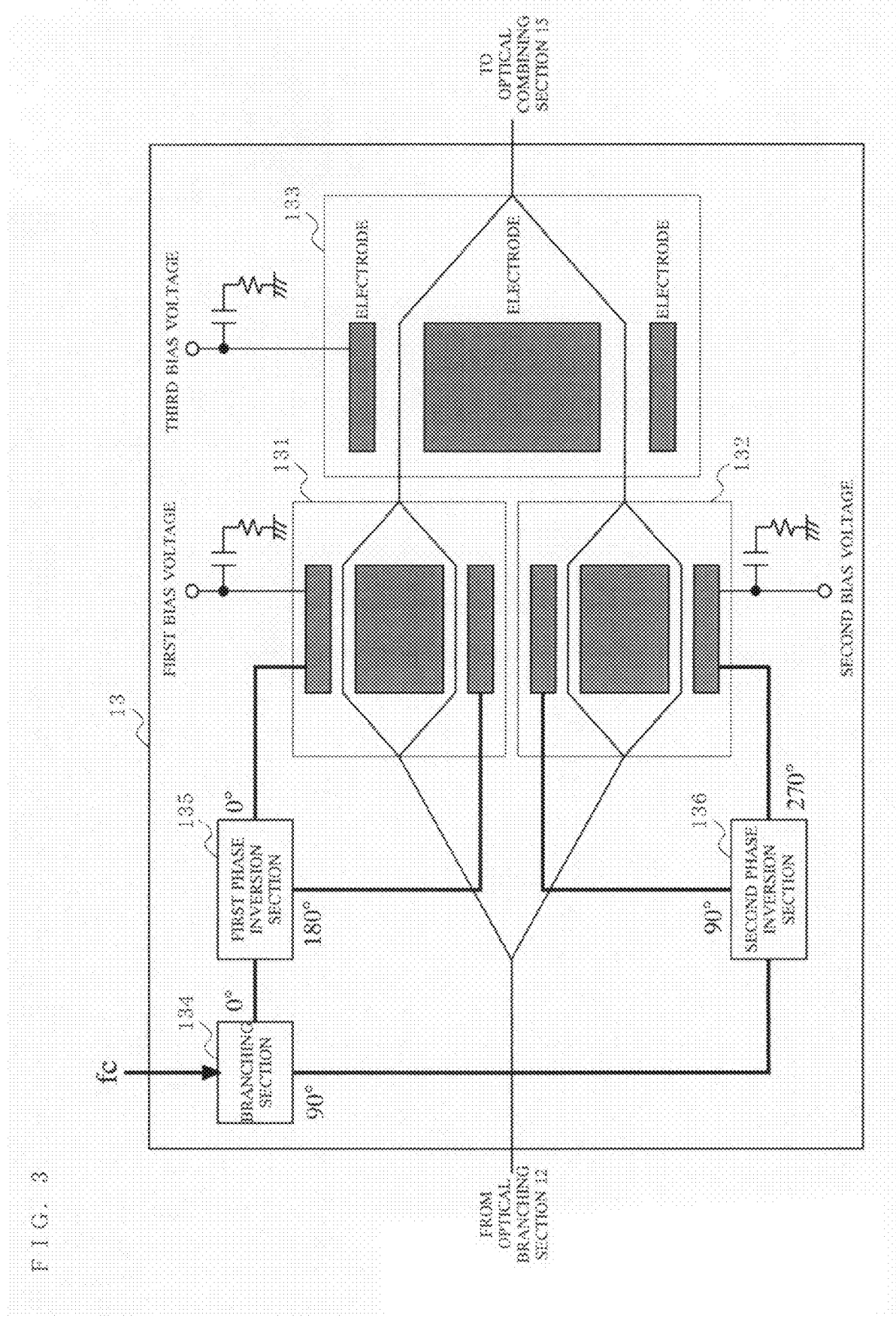
FIG. 3 is a schematic diagram showing an exemplary internal configuration of an optical SSB-SC modulation section 13.

FIG. 3 is a schematic diagram showing an exemplary internal configuration of an optical SSB-SC modulation section 13.

Referring to FIG. 3, the optical SSB-SC modulation section 13 includes first to third Mach-Zehnder interferometers 131 to 133, a branching section 134, and first and second phase inversion sections 135 and 136. The optical signal fa outputted from the optical branching section 12 is split into two signals to be inputted respectively to the first Mach-Zehnder interferometer 131 and the second Mach-Zehnder interferometer 132. The branching section 134 splits the input electric signal fc into the electric signal fc whose phase is 0° and the electric signal fc whose phase is 90°. The first phase inversion section 135 inverts the input electric signal fc whose phase is 0° to produce the electric signal fc whose phase is 180°, and supplies the electric signal fc whose phase is 0° and the electric signal fc whose phase is 180° to the electrodes of the first Mach-Zehnder interferometer 131. The second phase inversion section 136 inverts the input electric signal fc whose phase is 90° to produce the electric signal fc whose phase is 270°, and supplies the electric signal fc whose phase is 90° and the electric signal fc whose phase is 270° to the electrodes of the second Mach-Zehnder interferometer 132.

The first Mach-Zehnder interferometer 131 modulates the optical signal fa by using the electric signal fc whose phase is 0° and the electric signal fc whose phase is 180° as original signals, and outputs the resultant signal as a first optically modulated signal after adjusting the phase thereof with the first bias voltage. The second Mach-Zehnder interferometer 132 modulates the optical signal fa by using the electric signal fc whose phase is 90° and the electric signal fc whose phase is 270° as original signals, and outputs the resultant signal as a second optically modulated signal after adjusting the phase thereof with the second bias voltage. The third Mach-Zehnder interferometer 133 adjusts the phases of the first and second optically modulated signals with the third bias voltage, and then combines together the two optically modulated signals to thereby output the resultant signal. As a result, an optical intensity-modulated signal, which has been subjected to a single-sideband suppressed-optical carrier modulation (an optical SSB-SC modulation), is outputted from the optical SSB-SC modulation section 13 (FIG. 2 (2b)). Thus, the optical SSB-SC modulation section 13 subjects the input optical signal fa to an optical SSB-SC modulation based on the amplitude of the electric signal fc to thereby produce an optical intensity-modulated signal.

The optical phase modulation section 14 subjects the optical signal fa to an optical phase modulation based on the amplitude level of the first multi-channel signal to thereby produce an optical phase-modulated signal. In the first multi-channel signal inputted to the optical phase modulation section 14 (i.e., the first to $n^{th}$ electric signals), a signal of a lower frequency needs to be set to a higher amplitude level, and vice versa, so as to realize the same frequency deviation for all frequencies. Therefore, the first to $n^{th}$ electric signals having different amplitude levels according to their frequencies, as shown in FIG. 2 (2c), are inputted to the optical phase modulation section 14. Thus, the optical phase modulation section 14 outputs an optical phase-modulated signal having a bandwidth fw (FIG. 2 (2*d*)) using the first multi-channel signal as the original signal. Note that the optical phase modulation section 14 may be replaced by an optical frequency modulation section, being equivalent to the optical phase modulation section 14 in the angular modulation scheme.

The optical combining section 15 combines together the optical intensity-modulated signal outputted from the optical SSB-SC modulation section 13 and the optical phase-modulated signal outputted from the optical phase modulation section 14 (FIG. 2 (2*e*)). The optical detecting section 16 may be a photodiode having squared detection characteristics, or the like, and performs an optical homodyne detection through a squared detection of the optical intensity-modulated signal and the optical phase-modulated signal combined together by the optical combining section 15 to thereby produce a wideband modulated signal, being the difference beat signal between the two optical signals. The wideband modulated signal is a phase-modulated signal obtained by down-converting the optical phase-modulated signal outputted from the optical phase modulation section 14, and the center frequency thereof is fc (FIG. 2 (2*f*)).

The combining section 17 receives the wideband modulated signal outputted from the optical detecting section 16, and $o^{th}$ to $t^{th}$ electric signals having frequencies fo to ft (the second multi-channel signal) (FIG. 2 (2*g*)). The combining section 17 combines together the wideband modulated signal and the second multi-channel signal to output the resultant signal as a wideband modulated signal (FIG. 2 (2*h*)).

The optical transmitter section 18 maybe a semiconductor laser, or the like, and performs a predetermined modulation, e.g., an optical intensity modulation, on the $o^{th}$ to $t^{th}$ electric signals with the original signal being the wideband modulated signal outputted from the combining section 17 to thereby transmit the resultant signal as an optical wideband modulated signal to the optical fiber 70.

The operation of the components of the optical receiver 50 will now be described.

The optical receiver section 51 receives an optical wideband modulated signal transmitted through the optical fiber 70, and performs a photoelectric conversion to output a wideband modulated signal. The branching section 52 splits the wideband modulated signal outputted from the optical receiver section 51 into two signals to be inputted respectively to the first and second filters 53 and 54. The first filter 53 extracts a phase-modulated signal from the wideband modulated signal outputted from the branching section 52. For example, the first filter 53 may be a bandpass filter (BPF) for selectively allowing phase-modulated signals to pass therethrough, or a high-pass filter (HPF) whose cut-off frequency is greater than or equal to ft and less than or equal to (fc−fw/2). The one-dot chain line in FIG. 2 (2*h*) represents an example of the pass band of the first filter 53. Then, the signal outputted from the first filter 53 will have a spectrum as shown in FIG. 2 (2*f*).

The FM demodulation section 55 performs an FM demodulation on the phase-modulated signal outputted from the first filter 53 to thereby output the first multi-channel signal (FIG. 2 (2*i*)). Since phase modulation and frequency modulation are angular modulation schemes of substantially the same definition, the first multi-channel signal can be demodulated by the FM demodulation section 55. Since the first multi-channel signal is set to the same frequency deviation, the amplitude levels after the FM demodulation will be the same for all frequencies.

The second filter 54 extracts a second multi-channel signal from the wideband modulated signal outputted from the branching section 52. For example, the second filter 54 may be a BPF for selectively allowing the second multi-channel signal or a low-pass filter (LPF) whose cut-off frequency is greater than or equal to ft and less than or equal to (fc−fw/2). The two-dot chain line in FIG. 2 (2*h*) represents an example of the pass band of the second filter 54. Then, the signal outputted from the second filter 54 will have a spectrum as shown in FIG. 2 (2*g*).

The conventional technique and the present invention will now be compared with each other by way of specific numerical examples. For example, assume that the first multi-channel signal is a frequency multiplexed signal of the AM band and the QAM band (frequency: 90 MHz to 770 MHz (Japan) or 55 MHz to 860 MHz (US)), and the second multi-channel signal is a satellite broadcasting signal of the BS/CS broadcasting (frequency: 1 GHz to 2.6 GHz (Japan) or 950 MHz to 2.25 GHz (US)). Then, the bandwidth of the phase-modulated signal outputted from the optical detecting section 16 is about 2 GHz based on Expression 1 above. Thus, the frequency of the electric signal fc is determined at least so that the second multi-channel signal and the phase-modulated signal do not overlap with each other (ft<fc−fw/2) and that the band of the phase-modulated signal does not exceed that of the FM demodulation section 55 (fc+fw/2<fFM).

For example, where the frequency of the electric signal fc is 4 GHz, the frequency of the phase-modulated signal outputted from the optical detecting section 16 is widened to about 3 to 5 GHz. Since the frequency of the second multi-channel signal is 1 GHz to 2.6 GHz or 950 MHz to 2.25 GHz, these two signals do not overlap with each other. Moreover, since the frequency band of the wideband modulated signal can be as small as about up to 5 GHz, even if the FM demodulation section 155 used in the conventional optical transmission system 100 is used as the FM demodulation section 55, a demodulation operation no different from the conventional demodulation operation is performed, and it is possible to realize a required level of carrier-to-noise ratio in the first multi-channel signal outputted from the optical receiver 50. The second multi-channel signal extracted through the second filter 54 also does not deteriorate because there is no other overlapping signals.

As described above, with the optical transmission system 1 according to the first embodiment of the present invention, low-frequency signals are converted at once in an optical phase modulation to phase-modulated signals, which are multiplexed with a high-frequency signal. Thus, it is possible to increase the bandwidth of the multi-channel signal and to transmit the multi-channel signal at once, without a significant change in the design of the optical receiver 50, including the increase in the bandwidth of the FM demodulation section 55.

Figure 4:
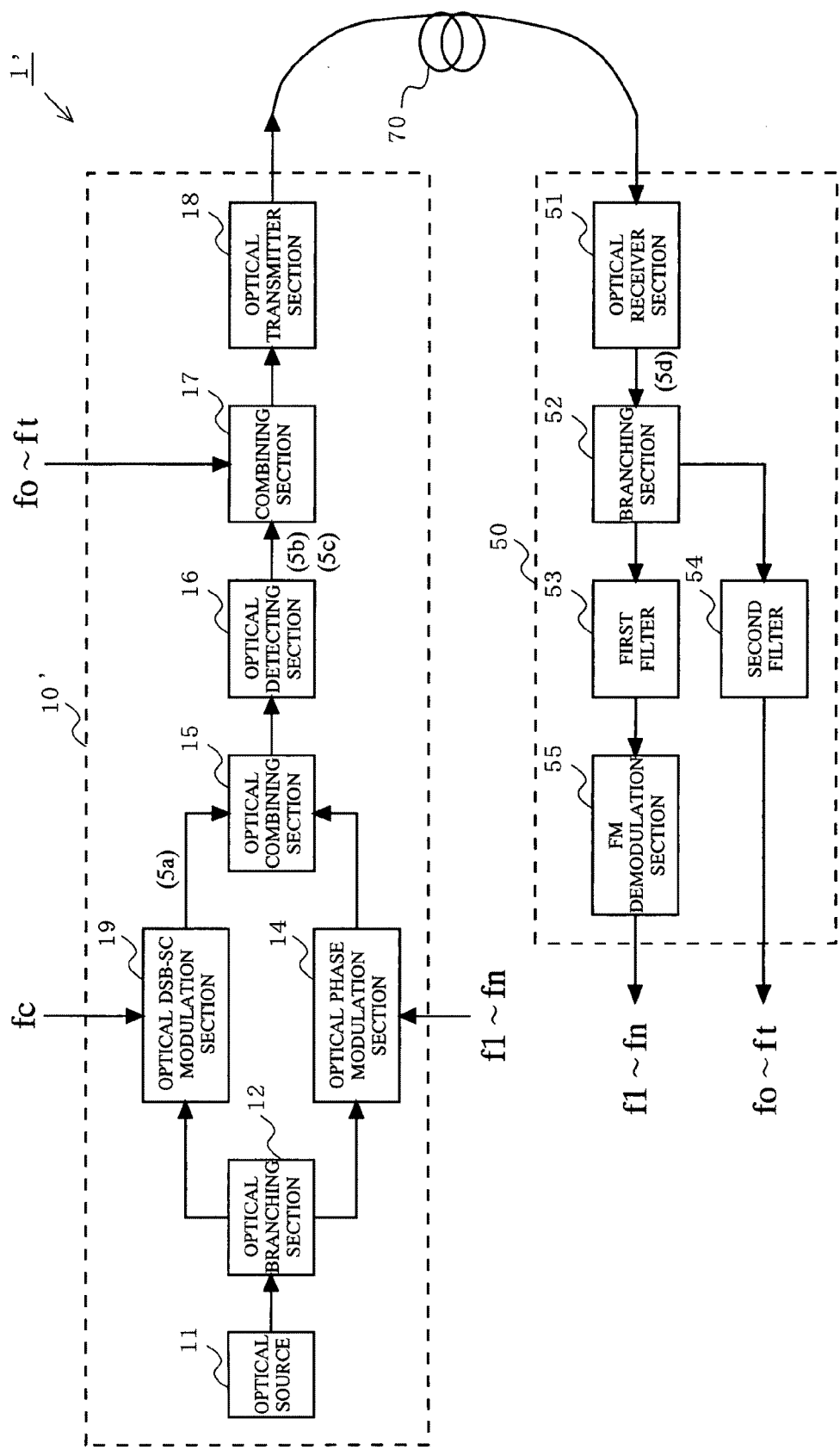
FIG. 4 is a block diagram showing a configuration of another optical transmission system 1' according to the first embodiment of the present invention.
Figure 5:
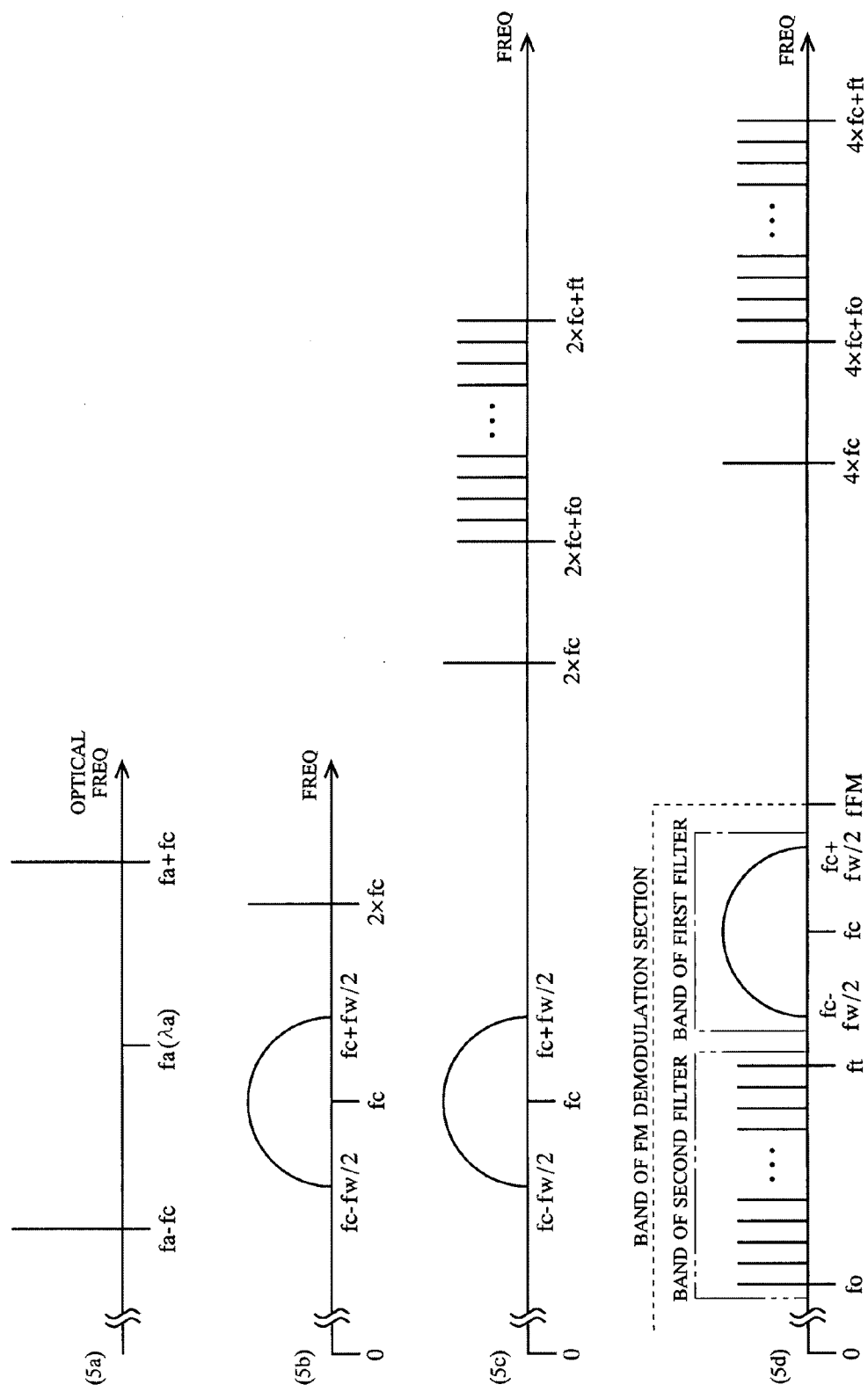
FIG. 5 is a schematic diagram showing exemplary signal spectra at different locations in the optical transmission system 1'.

While the first embodiment is directed to an example where an optical SSB-SC modulation is used for the optical intensity modulation section 13, an optical DSB-SC (Double Side Band with Suppressed Carrier) modulation may be used instead. FIG. 4 is a block diagram showing a configuration of an optical transmission system 1' according to the first embodiment, where an optical DSB-SC modulation section 19 is used instead of the optical SSB-SC modulation section 13. FIG. 5 is a schematic diagram showing exemplary signal spectra at different locations (5*a* to 5*d*) in the optical transmission system 1'.

The optical intensity-modulated signal (FIG. 5 (5*a*)) outputted from the optical DSB-SC modulation section 19 is an optical DSB-SC modulated signal with suppressed optical carrier having an optical frequency fa. The optical DSB-SC modulated signal and the optical phase-modulated signal are combined together and subjected to an optical homodyne detection, thereby obtaining substantially the same phase-modulated signal as that obtained where the optical SSB-SC modulation section 13 is used. The spectrum of the phase-modulated signal outputted from the optical detecting section 16 is as shown in FIG. 5 (5b). Thus, by selecting the frequency of the electric signal fc in a manner similar to that when the optical SSB-SC modulation section 13 is used, it is possible to increase the bandwidth of the multi-channel signal and to transmit the multi-channel signal at once. In this case, the phase-modulated signal is produced based on the difference beat component with two sidebands, whereby the carrier-to-noise ratio of the phase-modulated signal is improved as compared with a case where the optical SSB-SC modulation section 13 is used.

The second multi-channel signal may be a signal having frequencies (2×fc+fo to 2×fc+ft) or (2×fc−ft to 2×fc−fo) with a prerequisite condition fc+fw/2<2×fc−ft being satisfied. FIG. 5 (5c) is a schematic diagram showing an exemplary spectrum of the wideband modulated signal outputted from the combining section 17 where the second multi-channel signal has frequencies of (2×fc+fo to 2×fc+ft), for example. If the wideband modulated signal is transmitted by the optical transmitter section 18 to the optical receiver 50 as an optical wideband modulated signal, difference beat components between a signal having a frequency 2×fc and signals having frequencies 2×fc+fo to 2×fc+ft is produced at the optical receiver section 51, thereby outputting components of frequencies fc to ft. FIG. 5 (5d) is a schematic diagram showing an exemplary spectrum of a signal outputted from the optical receiver section 51. Therefore, it is possible to obtain, as the output of the optical receiver 50, a signal having substantially the same frequency as that obtained where the optical SSB-SC modulation section 13 is used.

Second Embodiment

Figure 6:
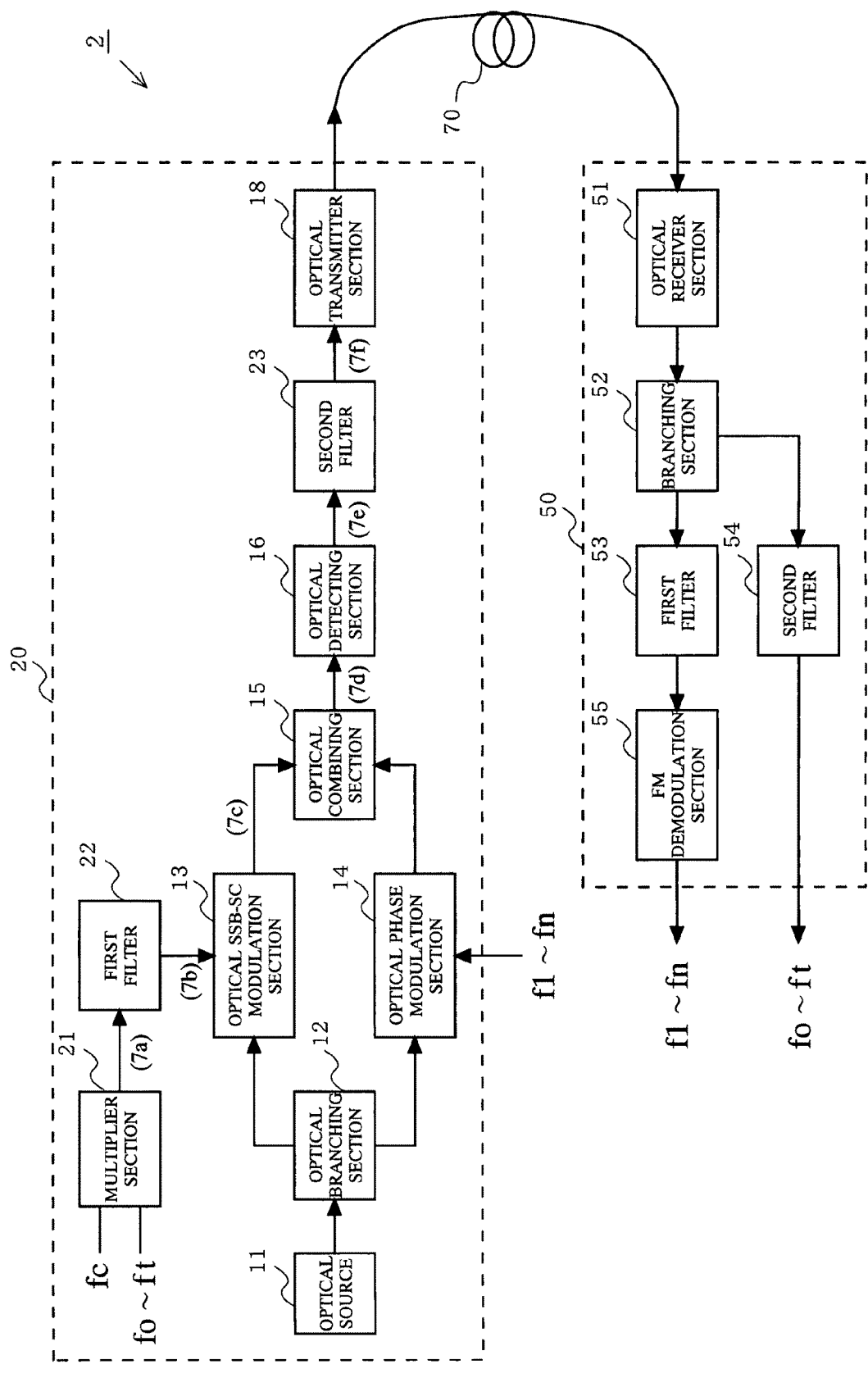
FIG. 6 is a block diagram showing a configuration of an optical transmission system 2 according to a second embodiment of the present invention.

FIG. 6 is a block diagram showing a configuration of an optical transmission system 2 according to a second embodiment of the present invention. The optical transmission system 2 includes an optical transmitter 20 and the optical receiver 50 connected to each other via the optical fiber 70. The optical transmitter 20 includes the optical source 11, the optical branching section 12, the optical SSB-SC modulation section 13, a multiplier section 21, a first filter 22, the optical phase modulation section 14, the optical combining section 15, the optical detecting section 16, a second filter 23, and the optical transmitter section 18. The configuration of the optical receiver 50 is the same as that of the first embodiment.

Figure 7:
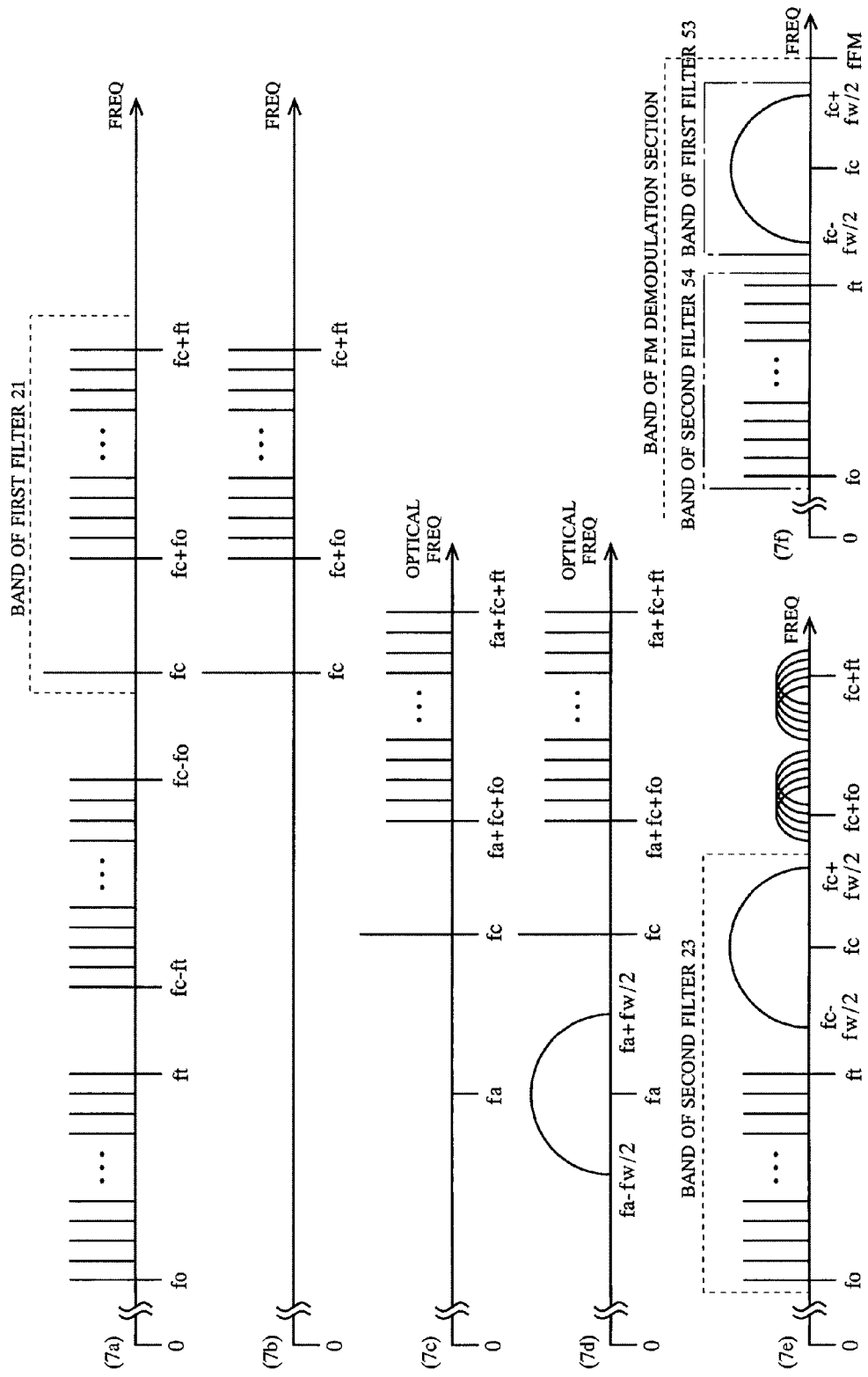
FIG. 7 is a schematic diagram showing exemplary signal spectra at different locations in the optical transmission system 2.

FIG. 7 is a schematic diagram showing exemplary signal spectra at different locations (7a to 7f) in the optical transmission system 2.

The optical transmission system 2 of the second embodiment differs from the optical transmission system 1 of the first embodiment in that the multiplier section 21, the first filter 22 and the second filter 23 are used instead of the combining section 17. Thus, the basic operation of the optical transmission system 2 is substantially the same as that of the optical transmission system 1. Therefore, like elements to those of the optical transmission system 1 will be denoted by like reference numerals and will not be further described below, and the operation of the optical transmission system 2 will be described below while focusing on the differing elements.

The multiplier section 21 receives the electric signal fc and the $o^{th}$ to $t^{th}$ electric signals having frequencies fo to ft to output a multiplied signal obtained by multiplying together these electric signals (FIG. 7 (7a)). For example, the multiplier section 21 is a commonly-available mixer, or the like. As shown in FIG. 7 (7a), the multiplied signal includes sum components (fc+fo to fc+ft) between the electric signal fc and the second multi-channel signal, difference components (fc−ft to fc−fo) therebetween, components of the second multi-channel signal, and a component of the electric signal fc.

The first filter 22 selectively allows signal components of a partial frequency band among all the components of the multiplied signal outputted from the multiplier section 21. It is herein assumed that the first filter 22 is a BPF that selectively allows components having frequencies fc to fc+ft to pass therethrough, for example. The broken line in FIG. 7 (7a) shows an exemplary pass band of the first filter 22. In this case, the multiplied signal from the multiplier section 21 passes through the first filter 22 to thereby selectively extract signal components having frequencies fc to fc+ft as shown in the spectrum illustrated in FIG. 7 (7b).

The optical SSB-SC modulation section 13 subjects the input optical signal fa to an optical SSB-SC modulation based on the amplitude level of the electric signal outputted from the first filter 22 to thereby output the resultant signal as an optical intensity-modulated signal (FIG. 7 (7c)). As shown in FIG. 7 (7c), the optical intensity-modulated signal is a single-sideband optical intensity-modulated signal in which the optical carrier whose optical frequency is fo is suppressed, with the original signals being the electric signal fc and the signal obtained through a frequency conversion of the second multi-channel signal.

The optical combining section 15 combines together the optical intensity-modulated signal outputted from the optical SSB-SC modulation section 13 and the optical phase-modulated signal outputted from the optical phase modulation section 14 (FIG. 7 (7d)). The optical detecting section 16 outputs a wideband modulated signal (FIG. 7 (7e)). The wideband modulated signal is a signal obtained by frequency-multiplexing together the phase-modulated signal whose center frequency is fc obtained by down-converting the optical phase-modulated signal outputted from the optical phase modulation section 14, a plurality of phase-modulated signals whose center frequencies are fc+fo to fc+ft, and the second multi-channel signal produced by down-converting the optical intensity-modulated signal outputted from the optical SSB-SC modulation section 13.

The second filter 23 selectively allows the second multi-channel signal and the phase-modulated signal whose center frequency is fc, among other components of the wideband modulated signal, to pass therethrough. It is assumed herein that the second filter 23 is a BPF that selectively allows signal components having frequencies fo to fc+fw/2 to pass therethrough, for example. The broken line in FIG. 7 (7e) shows an exemplary pass band of the second filter 23. In this case, as the wideband modulated signal passes through the second filter 23, the second multi-channel signal and the second optical signal outputted from the optical phase modulation section 14 are down-converted to obtain a phase-modulated signal whose center frequency is fc, as shown in FIG. 7 (7f).

As described above, with the optical transmission system 2 according to the second embodiment of the present invention, the electric signal to be inputted to the optical SSB-SC modulation section 13 from the first filter 22 is produced from an electric signal and the second multi-channel signal. Therefore, it is possible to increase the bandwidth of the multi-channel signal and to transmit the multi-channel signal at once, without providing a frequency conversion section for the down conversion in the optical receiver 50.

It is understood that the optical SSB-SC modulation section 13 of the optical transmission system 2 according to the second embodiment may be replaced by the optical DSB-SC modulation section 19 as described above in the first embodiment.

The second filter 23 may be omitted and the wideband modulated signal may be inputted directly to the optical transmitter section 18. In this case, among the spectrum components shown in FIG. 7 (7e), the phase-modulated signal whose center frequencies are fc+fo to fc+ft has a level that is sufficiently smaller than those of the second multi-channel signal and the phase-modulated signal whose center frequency is fc, whereby there is little deterioration caused by the phase-modulated signal whose center frequencies are fc+fo to fc+ft. These components will not be outputted from the optical receiver 50 since the first filter 53 and the second filter 54 are provided in the optical receiver 50. In such a case, it is possible to more easily increase the bandwidth of the multi-channel signal since it is no longer necessary to adjust the group delay between the optical detecting section 116 and the optical transmitter section 118 in the conventional optical transmitter 110.

Third Embodiment

Figure 8:
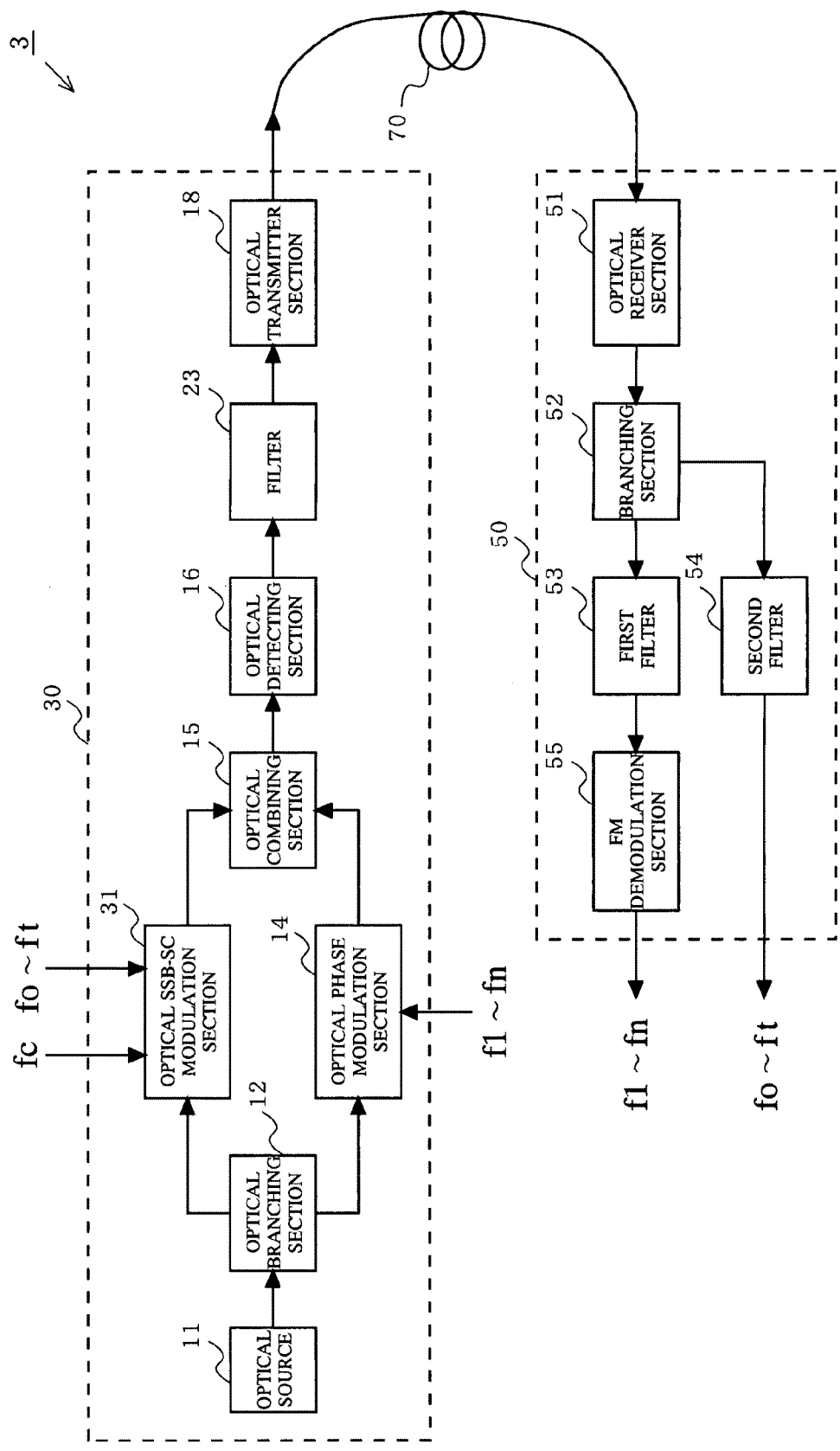
FIG. 8 is a block diagram showing a configuration of an optical transmission system 3 according to a third embodiment of the present invention.

FIG. 8 is a block diagram showing a configuration of an optical transmission system 3 according to a third embodiment of the present invention. The optical transmission system 3 includes an optical transmitter 30 and the optical receiver 50 connected to each other via the optical fiber 70. The optical transmitter 30 includes the optical source 11, the optical branching section 12, the optical SSB-SC modulation section 31, the optical phase modulation section 14, the optical combining section 15, the optical detecting section 16, the filter 23, and the optical transmitter section 18. The configuration of the optical receiver 50 is the same as those of the first and second embodiments.

The optical transmission system 3 of the third embodiment differs from the optical transmission system 2 of the second embodiment in that the multiplier section 21, the first filter 22 and the optical SSB-SC modulation section 13 are replaced by the optical SSB-SC modulation section 31. Thus, the basic operation of the optical transmission system 3 is substantially the same as that of the optical transmission system 2. Therefore, like elements to those of the optical transmission system 2 will be denoted by like reference numerals and will not be further described below, and the operation of the optical transmission system 3 will be described below while focusing on the differing elements.

Figure 9:
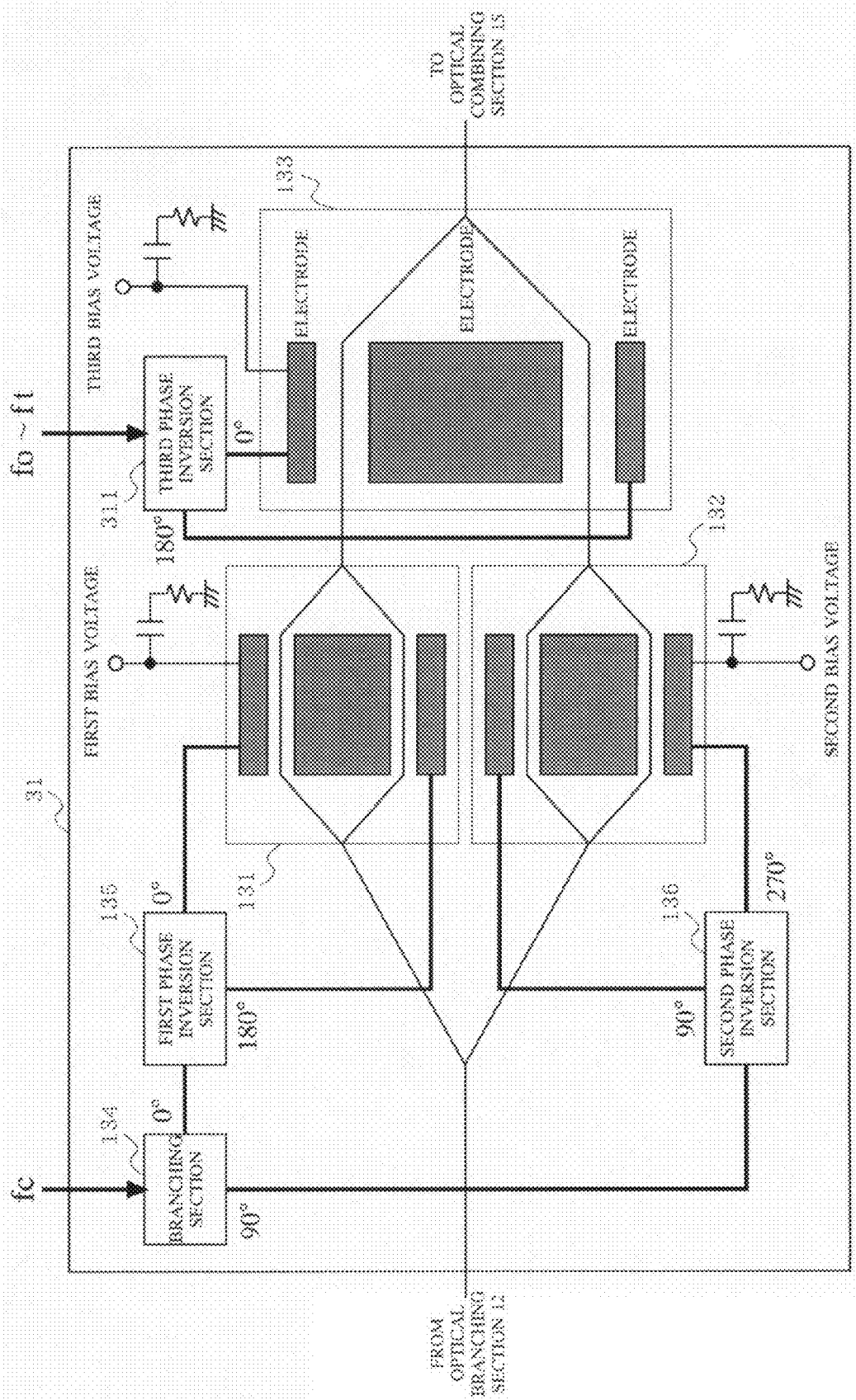
FIG. 9 is a schematic diagram showing an exemplary internal configuration of an optical SSB-SC modulation section 31.

FIG. 9 is a schematic diagram showing an exemplary internal configuration of the optical SSB-SC modulation section 31. Referring to FIG. 9, the optical SSB-SC modulation section 31 includes the first to third Mach-Zehnder interferometers 131 to 133, the branching section 134, and first to third phase inversion sections 135, 136 and 311. As can be seen from FIG. 9, the optical SSB-SC modulation section 31 differs from the optical SSB-SC modulation section 13 in that the third phase inversion section 311 is provided.

The third phase inversion section 311 receives the $o^{th}$ to $t^{th}$ electric signals having frequencies fo to ft, and supplies the $o^{th}$ to $t^{th}$ electric signals whose phase is 0° and the $o^{th}$ to $t^{th}$ electric signals whose phase is 180° to the electrodes of the third Mach-Zehnder interferometer 133. The third Mach-Zehnder interferometer 133 adjusts the phases of the first and second optically modulated signals with the third bias voltage, and then combines together the two optically modulated signals to thereby output the resultant signal. In this case, an exemplary spectrum of the optical intensity-modulated signal outputted from the optical SSB-SC modulation section 31 is substantially the same as that of the optical intensity-modulated signal outputted from the optical SSB-SC modulation section 13 shown in FIG. 7 (7c).

As described above, with the optical transmission system 3 according to the third embodiment of the present invention, it is possible to increase the bandwidth of the multi-channel signal and to transmit the multi-channel signal at once, without providing the multiplier section 21 and the first filter 22.

It is understood that the optical SSB-SC modulation section 31 of the optical transmission system 3 according to the third embodiment may be replaced by the optical DSB-SC modulation section 19 as described above in the first embodiment.

Fourth Embodiment

Figure 10A:
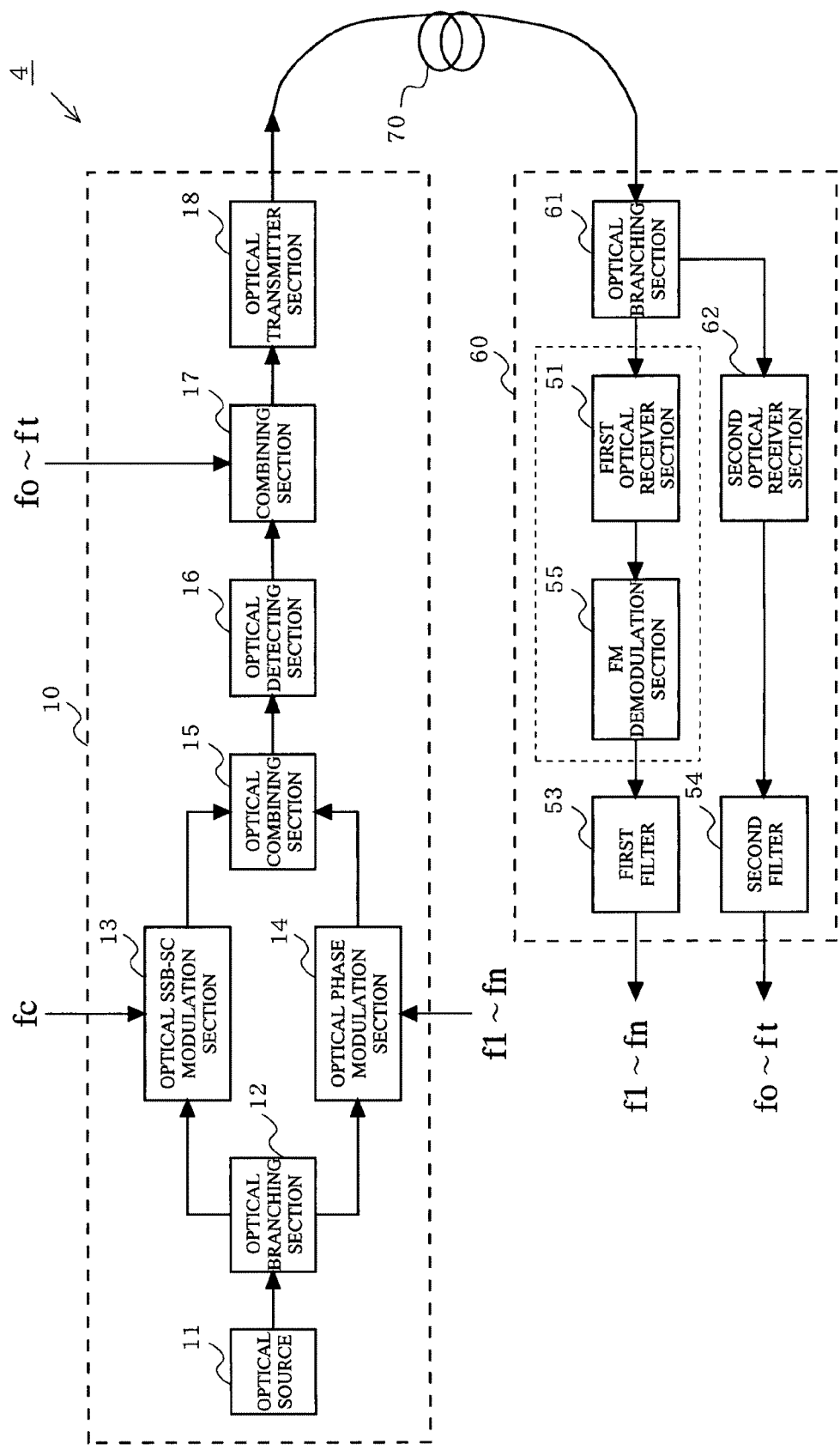
FIGS. 10A to 10C are block diagrams showing optical transmission systems 4 to 6 according to a fourth embodiment of the present invention.

FIG. 10A is a block diagram showing a configuration of an optical transmission system 4 according to a fourth embodiment of the present invention. The optical transmission system 4 includes the optical transmitter 10 and an optical receiver 60 connected to each other via the optical fiber 70. The configuration of the optical transmitter 10 is the same as that of the first embodiment. The optical receiver 60 includes an optical branching section 61, first and second optical receiver sections 51 and 62, the FM demodulation section 55, and the first and second filters 53 and 54.

The optical transmission system 4 of the fourth embodiment differs from the optical transmission system 1 of the first embodiment in that the optical branching section 61 and the second optical receiver section 62 are added to the optical receiver 60. Thus, the basic operation of the optical transmission system 4 is substantially the same as that of the optical transmission system 1. Therefore, like elements to those of the optical transmission system 1 will be denoted by like reference numerals and will not be further described below, and the operation of the optical transmission system 4 will be described below while focusing on the differing elements.

The optical branching section 61 receives an optical wideband modulated signal through the optical fiber 70, and splits the received signal into two optical wideband modulated signals to be inputted respectively to the first and second optical receiver sections 51 and 62. The first optical receiver section 51 subjects the optical wideband modulated signal to a photoelectric conversion to output the resultant signal as a first wideband modulated signal. The first wideband modulated signal is substantially the same as the wideband modulated signal shown in FIG. 2 (2h). The second optical receiver section 62 subjects the optical wideband modulated signal to a photoelectric conversion to output the resultant signal as a second wideband modulated signal. The second wideband modulated signal is also substantially the same as the wideband modulated signal shown in FIG. 2 (2h).

As described above, with the optical transmission system 4 according to the fourth embodiment of the present invention, the optical wideband modulated signal is split by the optical branching section 61, whereby the conventional configuration where the FM demodulation section 55 follows the optical receiver section 51 can be used without making a change thereto.

Figure 10B:
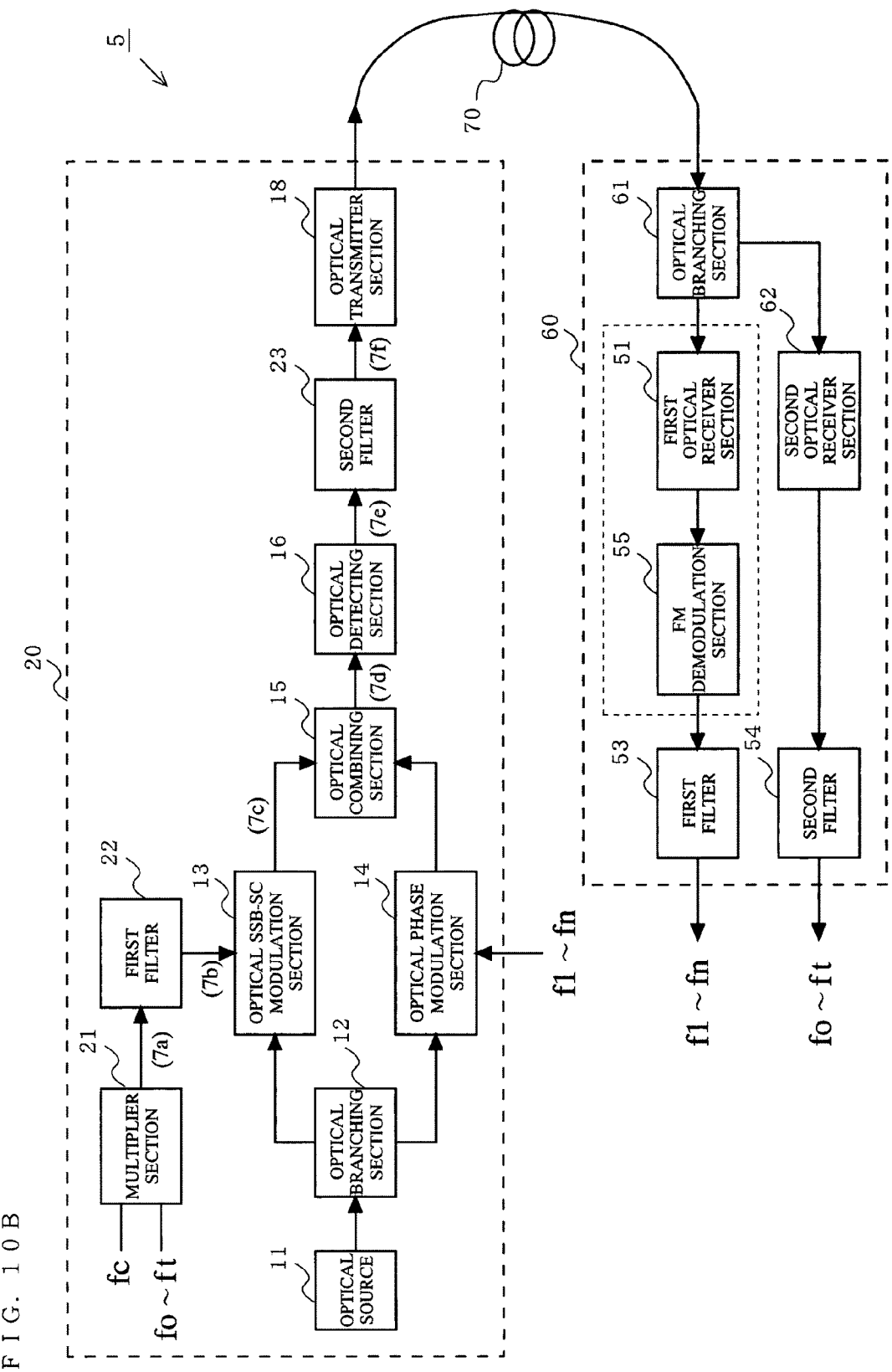
Figure 10C:
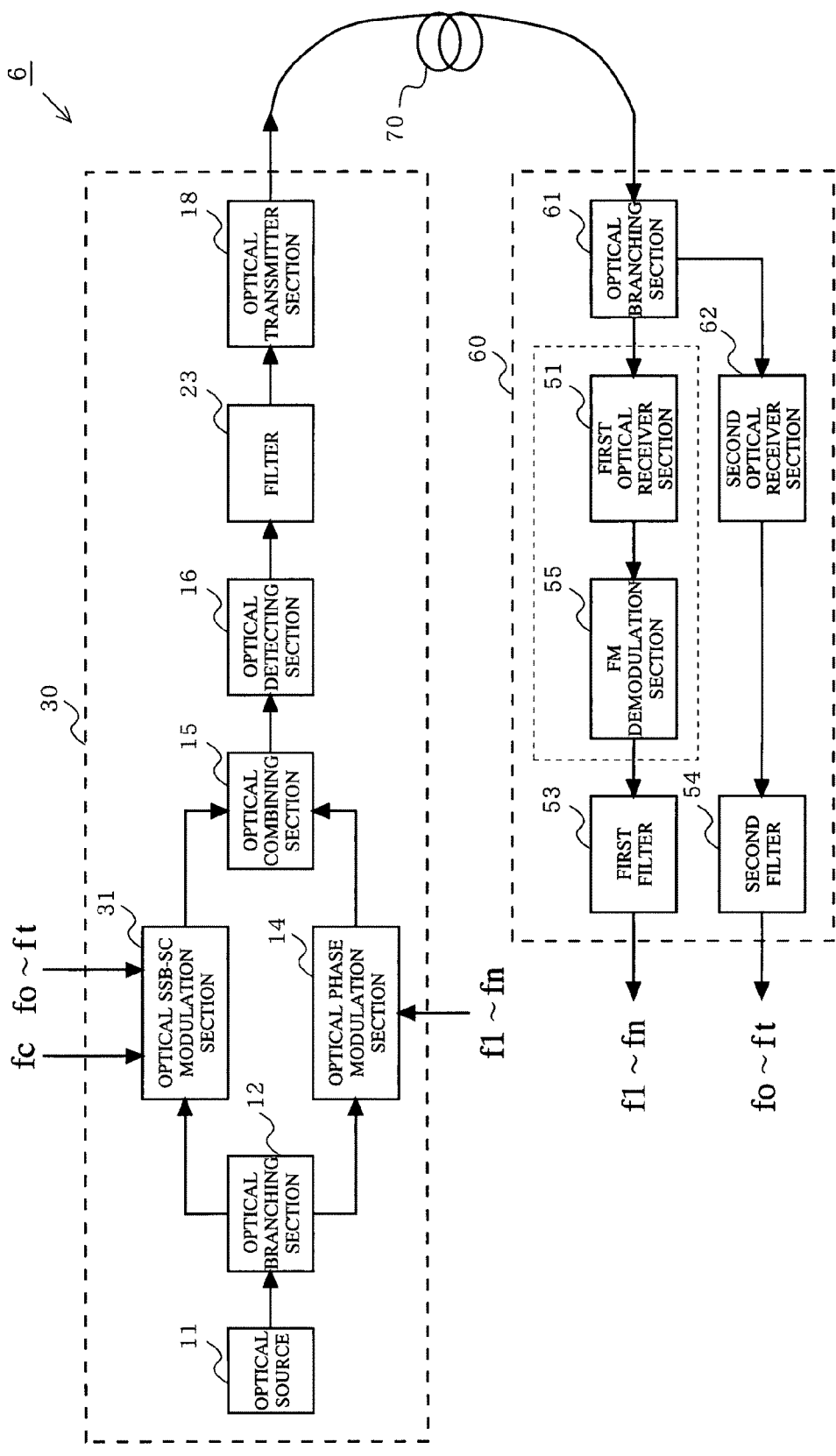
Figure 11:
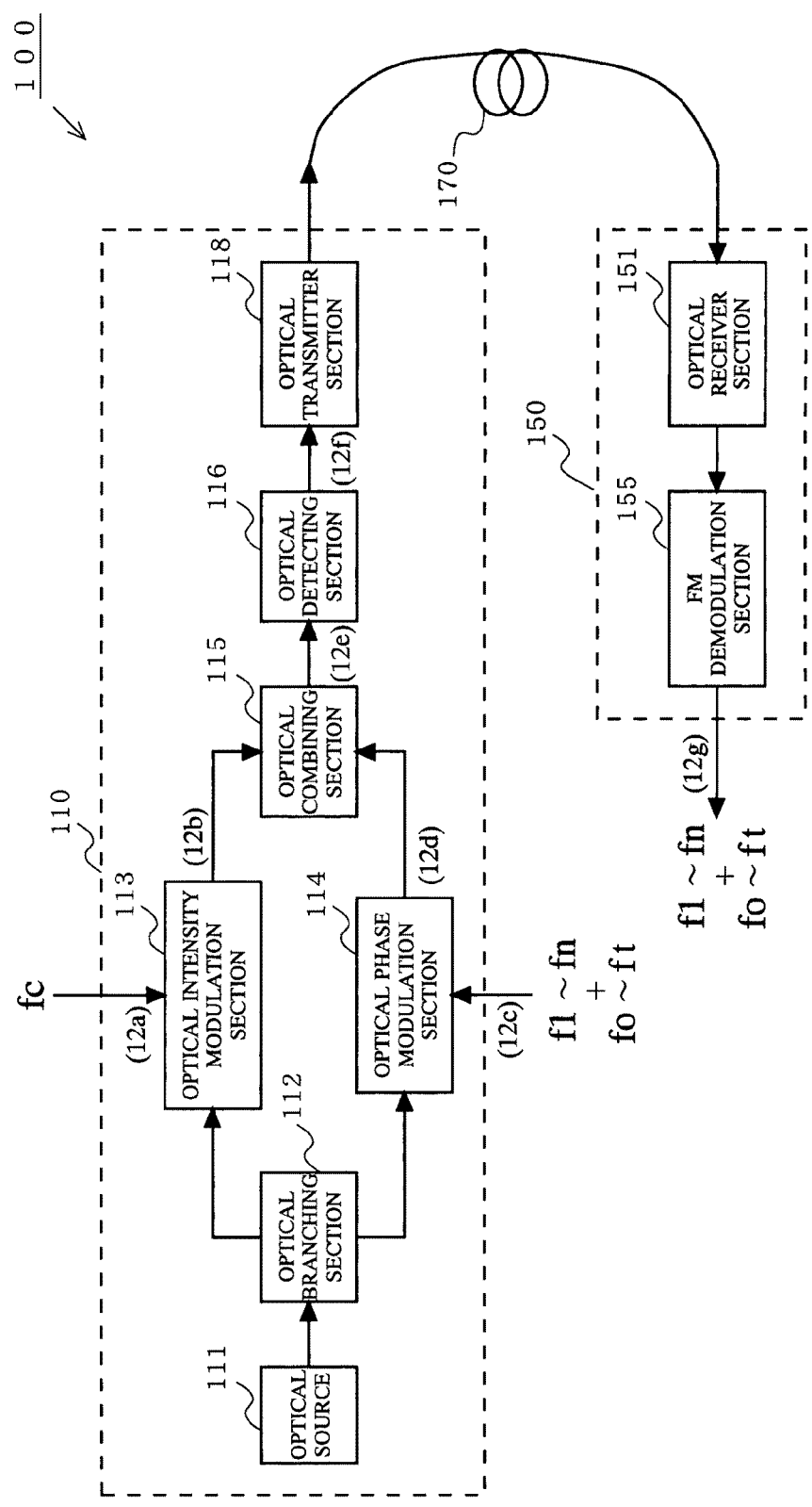
FIG. 11 is a block diagram showing a configuration of a conventional optical transmission system 100.
Figure 12:
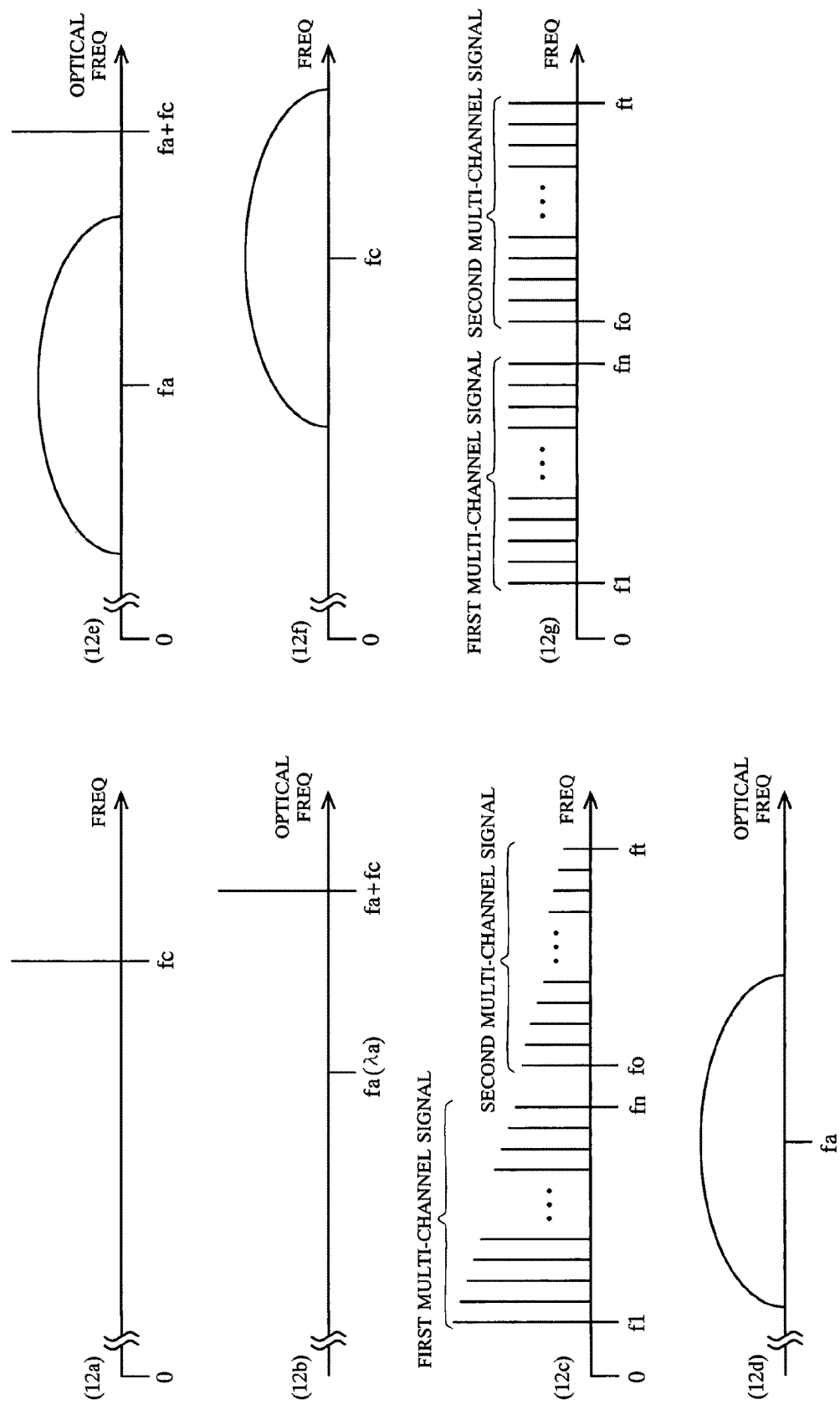
FIG. 12 is a schematic diagram showing exemplary signal spectra at different locations in the conventional optical transmission system 100.

It is understood that the configuration of the optical receiver 60 may be used in place of the optical receiver 50 of the second and third embodiments (FIGS. 10B and 10C). Moreover, the optical SSB-SC modulation section 13 of the optical transmission system 4 according to the fourth embodiment may be replaced by the optical DSB-SC modulation section 19 of the first embodiment.

While the invention has been described in detail, the foregoing description is in all aspects illustrative and not restrictive. It is understood that numerous other modifications and variations can be devised without departing from the scope of the invention.

What is claimed is:

1. An optical transmitter for optically transmitting a plurality of electric signals, the optical transmitter comprising:
    an optical source operable to output an unmodulated optical signal;
    an optical branching section operable to split the optical signal into two signals;
    a multiplier section operable to multiply together an electric signal having a frequency fc and a plurality of electric signals having frequencies fo to ft (fo<ft);
    a filter operable to selectively extract signal components having frequencies fc to fc+ft from the signal obtained by the multiplication at the multiplier section;
    an optical intensity modulation section operable to subject one of the split optical signals from the optical branching section to an optical intensity modulation with an electric signal of a predetermined frequency extracted by the filter to thereby produce an optical intensity-modulated signal;
    an optical angle modulation section operable to subject the other one of the split optical signals from the optical branching section to an optical angular modulation with a plurality of electric signals having frequencies f1 to fn (f1<fn) different from frequencies fo to ft to thereby produce an optical angle-modulated signal;
    an optical combining section operable to optically combine together the optical intensity-modulated signal and the optical angle-modulated signal;
    an optical detecting section operable to subject the combined optical signal from the optical combining section to a squared detection to thereby convert the combined optical signal to a modulated signal; and
    an optical transmitter section operable to convert the modulated signal from the optical detecting section to an optical signal and transmitting the obtained optical signal.

2. An optical transmitter according to claim 1, wherein the frequency fc, a bandwidth fw of the optical angle-modulated signal, and the frequency ft satisfy ft<fc−fw/2.

3. An optical transmitter according to claim 2, further comprising a filter operable to selectively extract signal components having frequencies fo to fc+fw/2 from the modulated signal from the optical detecting section to output the extracted signal components to the optical transmitter section.

4. An optical transmitter according to claim 1, wherein the optical intensity modulation performed by the optical intensity modulation section is a single-sideband suppressed-optical carrier optical intensity modulation or a double-sideband suppressed-optical carrier optical intensity modulation.

5. An optical transmitter according to claim 2, wherein the optical intensity modulation performed by the optical intensity modulation section is a single-sideband suppressed-optical carrier optical intensity modulation or a double-sideband suppressed-optical carrier optical intensity modulation.

6. An optical transmitter according to claim 3, wherein the optical intensity modulation performed by the optical intensity modulation section is a single-sideband suppressed-optical carrier optical intensity modulation or a double-sideband suppressed-optical carrier optical intensity modulation.

7. An optical transmission system, comprising an optical transmitter for optically transmitting a plurality of electric signals and an optical receiver for receiving an optical signal, the optical transmitter comprising:
    an optical source operable to output an unmodulated optical signal;
    an optical branching section operable to split the optical signal into two signals;
    a multiplier section operable to multiply together an electric signal having a frequency fc and a plurality of electric signals having frequencies fo to ft (fo<ft);
    a first filter operable to selectively extract signal components having frequencies fc to fc+ft from the signal obtained by the multiplication at the multiplier section;
    an optical intensity modulation section operable to subject one of the split optical signals from the optical branching section to an optical intensity modulation with an electric signal of a predetermined frequency extracted by the first filter to thereby produce an optical intensity-modulated signal;
    an optical angle modulation section operable to subject the other one of the split optical signals from the optical branching section to an optical angular modulation with a plurality of electric signals having frequencies f1 to fn (f1<fn) different from frequencies fo to ft to thereby produce an optical angle-modulated signal;
    an optical combining section operable to optically combine together the optical intensity-modulated signal and the optical angle-modulated signal;
    an optical detecting section operable to subject the combined optical signal from the optical combining section to a squared detection to thereby convert the combined optical signal to a modulated signal; and
    an optical transmitter section operable to convert the modulated signal from the optical detecting section to an optical signal and transmitting the obtained optical signal, the optical receiver comprising:
    an optical receiver section operable to receive the optical signal transmitted from the optical transmitter section and converting the received optical signal to a modulated signal;
    a branching section operable to split the modulated signal from the optical receiver section into two signals;
    a second filter operable to selectively extract signal components having frequencies f1 to fn from one of the split signals from the branching section;
    a third filter operable to selectively extract signal components having frequencies fo to ft from the other one of the split signals from the branching section; and
    an FM demodulation section operable to perform an FM demodulation on the electric signal extracted through the second filter.

8. An optical transmission system, comprising an optical transmitter for optically transmitting a plurality of electric signals and an optical receiver for receiving an optical signal, the optical transmitter comprising:
    an optical source operable to output an unmodulated optical signal;
    an optical branching section operable to split the optical signal into two signals;
    a multiplier section operable to multiply together an electric signal having a frequency fc and a plurality of electric signals having frequencies fo to ft (fo<ft);
    a first filter operable to selectively extract signal components having frequencies fc to fc+ft from the signal obtained by the multiplication at the multiplier section;

an optical intensity modulation section operable to subject one of the split optical signals from the optical branching section to an optical intensity modulation with an electric signal of a predetermined frequency extracted by the first filter to thereby produce an optical intensity-modulated signal;

an optical angle modulation section operable to subject the other one of the split optical signals from the optical branching section to an optical angular modulation with a plurality of electric signals having frequencies f1 to fn (f1<fn) different from frequencies fo to ft to thereby produce an optical angle-modulated signal;

an optical combining section operable to optically combine together the optical intensity-modulated signal and the optical angle-modulated signal;

an optical detecting section operable to subject the combined optical signal from the optical combining section to a squared detection to thereby convert the combined optical signal to a modulated signal; and an optical transmitter section operable to convert the modulated signal from the optical detecting section to an optical signal and transmitting the obtained optical signal, the optical receiver comprising:

a branching section operable to split the optical signal transmitted from the optical transmitter section into two signals;

a first optical receiver section operable to receive one of the split optical signals from the branching section and converting the received optical signal to a modulated signal;

a second optical receiver section operable to receive the other one of the split optical signals from the branching section and converting the received optical signal to a modulated signal;

an FM demodulation section operable to perform an FM demodulation on the modulated signal from the first optical receiver section;

a second filter operable to selectively extract signal components having the frequencies f1 to fn from the FM-demodulated signal from the FM demodulation section; and a third filter operable to selectively extract signal components having the frequencies fo to ft from the modulated signal from the second optical receiver section.

* * * * *